(12) United States Patent
Brown

(10) Patent No.: US 8,295,293 B1
(45) Date of Patent: Oct. 23, 2012

(54) PREDICTIVE FLOW CONTROL FOR A PACKET SWITCH

(75) Inventor: David Alan Brown, Carp (CA)

(73) Assignee: Integrated Device Technology, Inc., San Jose, CA (US)

( * ) Notice: Subject to any disclaimer, the term of this patent is extended or adjusted under 35 U.S.C. 154(b) by 285 days.

(21) Appl. No.: 12/639,938

(22) Filed: Dec. 16, 2009

(51) Int. Cl.
  *H04L 12/28* (2006.01)
  *H04L 12/56* (2006.01)

(52) U.S. Cl. ........ 370/401; 370/419; 370/422; 370/462; 370/463

(58) Field of Classification Search .................... 370/401
  See application file for complete search history.

(56) References Cited

U.S. PATENT DOCUMENTS

| | | | |
|---|---|---|---|
| 7,581,044 B1 * | 8/2009 | Davis | 710/52 |
| 7,694,049 B2 * | 4/2010 | Goh et al. | 710/107 |
| 7,698,477 B2 * | 4/2010 | Breti et al. | 710/29 |
| 7,698,478 B2 * | 4/2010 | Wang et al. | 710/29 |
| 7,852,757 B1 * | 12/2010 | Puranik | 370/229 |
| 8,040,907 B2 * | 10/2011 | Naven et al. | 370/413 |
| 8,050,265 B2 * | 11/2011 | Naven et al. | 370/390 |

* cited by examiner

*Primary Examiner* — Ayaz Sheikh
*Assistant Examiner* — Blanche Wong
(74) *Attorney, Agent, or Firm* — Kenneth Glass; Stanley J. Pawlik; Glass & Associates

(57) ABSTRACT

A packet switch issues credits to a link partner based on credit values and updates the credit values to indicate credits consumed by the link partner based on packets received from the link partner by the ingress port. Additionally, the packet switch selects credit threshold values corresponding to a transmission period of imminent credit starvation of the link partner and compares the updated credit values with the credit threshold values. The packet switch issues additional credits to the link partner when at least one of the updated credit values has reached a corresponding credit threshold value. In some embodiments, the packet switch also issues additional credits to the link partner during idle transmission periods.

27 Claims, 8 Drawing Sheets

PREDICTIVE FLOW CONTROL FOR A PACKET SWITCH

BACKGROUND

The Peripheral Component Interconnect Special Interest Group (PCI-SIG) is a non-profit electronics industry consortium responsible for specifying Peripheral Component Interconnect Express (PCIe) standards. One standard specified by PCI-SIG is the PCIe Base 2.0 specification. The PCIe Base 2.0 specification specifies a credit-based, flow-control protocol for transmitting packets between endpoints connected to a PCIe bus. According to the PCIe Base 2.0 specification, a packet should be transmitted to an endpoint only when the endpoint is able to accept the packet. In this way, retransmission of a packet to an endpoint is avoided when the endpoint is not currently able to accept the packet.

In one type of packet switch including a PCIe bus, the packet switch allocates credits indicating the ability of an ingress port of the packet switch to accept a packet. In turn, the ingress port makes the credits available to an endpoint external to the packet switch by transmitting a flow control packet to the endpoint. In this way, the ingress port advertises the credits to the endpoint. Further, the packet switch employs a timer-based scheme in which the ingress port periodically transmits a flow control packet indicating whether any additional credits are available to the endpoint. The endpoint determines based on the flow control packets whether the ingress buffer is able to accept a packet. Moreover, the endpoint consumes one or more of the available credits for each packet transmitted from the endpoint to the ingress port of the packet switch.

Generally, credit starvation occurs when the endpoint does not have sufficient credits available for transmitting a packet to the ingress port. Moreover, the maximum interval is selected to avoid credit starvation at the endpoint regardless of the size or number of packets transmitted from the endpoint to the ingress port. As a result, the ingress port may send more flow control packets to the endpoint than are needed to avoid credit starvation in the endpoint. The flow control packets, however, consume bandwidth of the ingress port, which may otherwise be utilized for transmitting other packets from the ingress port to the endpoint.

SUMMARY

In various embodiments, a packet switch includes an ingress port and a credit control circuit for issuing credits to a link partner based on credit values of the ingress port. For example, the link partner may be an endpoint, a root complex, or another packet switch. In turn, the link partner transmits packets to the ingress port based on the credit values. The credit control circuit updates the credit values in response to the ingress port receiving the packets to indicate credits consumed by the link partner for the packets. Additionally, the credit control circuit selects credit threshold values corresponding to a transmission period of imminent credit starvation of the link partner and compares the updated credit values with the credit threshold values. Further, the credit control circuit issues additional credits to the link partner when at least one of the updated credit values has reached a corresponding credit threshold value. In this way, the credit control circuit issues the additional credits to the link partner just in time to prevent credit starvation in the link partner. Moreover, the packet switch need not include a timing circuit for determining when additional credits are issued to the link partner.

In further embodiments, the credit control circuit issues additional credits to the link partner by generating flow control update packets indicating updated credit values. In turn, the ingress port transmits the flow control update packets to the link partner, which consumes some of the bandwidth of the ingress port. Because the credit control circuit issues additional credits to the link partner just in time to prevent credit starvation in the link partner, the bandwidth of the ingress port consumed by transmitting flow control packets to the link partner is reduced (e.g., minimized). In some embodiments, the credit control circuit also issues additional credits to the link partner by generating flow control packets for transmission to the link partner in idle transmission periods. In this way, the bandwidth of the ingress port consumed by transmitting flow control update packets to the link partner is further reduced (e.g., further minimized).

An integrated circuit device, in accordance with one embodiment, includes a packet switch having an ingress port and an egress port. The packet switch includes a credit control circuit coupled to the ingress port and configured to issue initial credits to a link partner based on credit values of the ingress port. The credit control circuit is also configured to update the credit values to indicate credits consumed by the link partner as packets are received from the link partner at the ingress port. Further, the credit control circuit is configured to select credit threshold values corresponding to a transmission period of imminent credit starvation for the link partner and compare the updated credit values with the credit threshold values. Additionally, the credit control circuit is configured to issue additional credits to the link partner when at least one of the updated credit values has reached a corresponding credit threshold value. Moreover, the credit control circuit is configured to issue the additional credits to the link partner by generating a flow control update packet indicating the additional credits for transmission to the link partner.

An integrated circuit device, in accordance with one embodiment, includes a packet switch having an ingress port and an egress port. The packet switch includes a credit control circuit coupled to the ingress port and configured to allocate credits for the ingress port by allocating credits to transaction types for packets. The credits allocated to each transaction type include both a header credit indicating an available storage capacity of the ingress port for storing a packet header of a packet having the transaction type and a data credit indicating an available storage capacity of the ingress port for storing a data segment of a data payload of a packet having the transaction type. The credit control circuit is further configured to issue initial credits to a link partner based on credit values of the ingress port and update the credit values to indicate credits consumed by the link partner as packets are received from the link partner the ingress port. Further, the credit control circuit is configured to select credit threshold values corresponding to a transmission period of imminent credit starvation for the link partner and compare the updated credit values with the credit threshold values. Additionally, the credit control circuit is configured to issue additional credits to the link partner when at least one of the updated credit values has reached a corresponding credit threshold value. Moreover, the credit control circuit is configured to issue the additional credits to the link partner by generating a flow control update packet indicating the additional credits for transmission to the link partner.

A method, in accordance with one embodiment, controls packet flow in a packet switch having an ingress port and an egress port. The method includes issuing initial credits to a link partner based on credit values of the ingress port and updating the credit values to indicate credits consumed by the link partner as packets are received from the link partner at the ingress port. The method also includes selecting credit threshold values corresponding to a transmission period of imminent credit starvation of the link partner and comparing the updated credit values with the credit threshold values. Additionally, the method includes issuing additional credits to the link partner when at least one of the updated credit values has reached a corresponding credit threshold value by transmitting a flow control update packet indicating the additional credits to the link partner.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

In various embodiments, a packet switch issues credits to a link partner based on credit values and updates the credit values to indicate credits consumed by the link partner based on packets received from the link partner by the ingress port. Additionally, the packet switch selects credit threshold values corresponding to a transmission period of imminent credit starvation of the link partner and compares the updated credit values with the credit threshold values. The packet switch issues additional credits to the link partner when at least one of the updated credit values has reached a corresponding credit threshold value. In this way, the packet switch issues the additional credits to the link partner just in time to prevent credit starvation in the link partner. In some embodiments, the packet switch also issues additional credits to the link partner during idle transmission periods.

Figure 1:
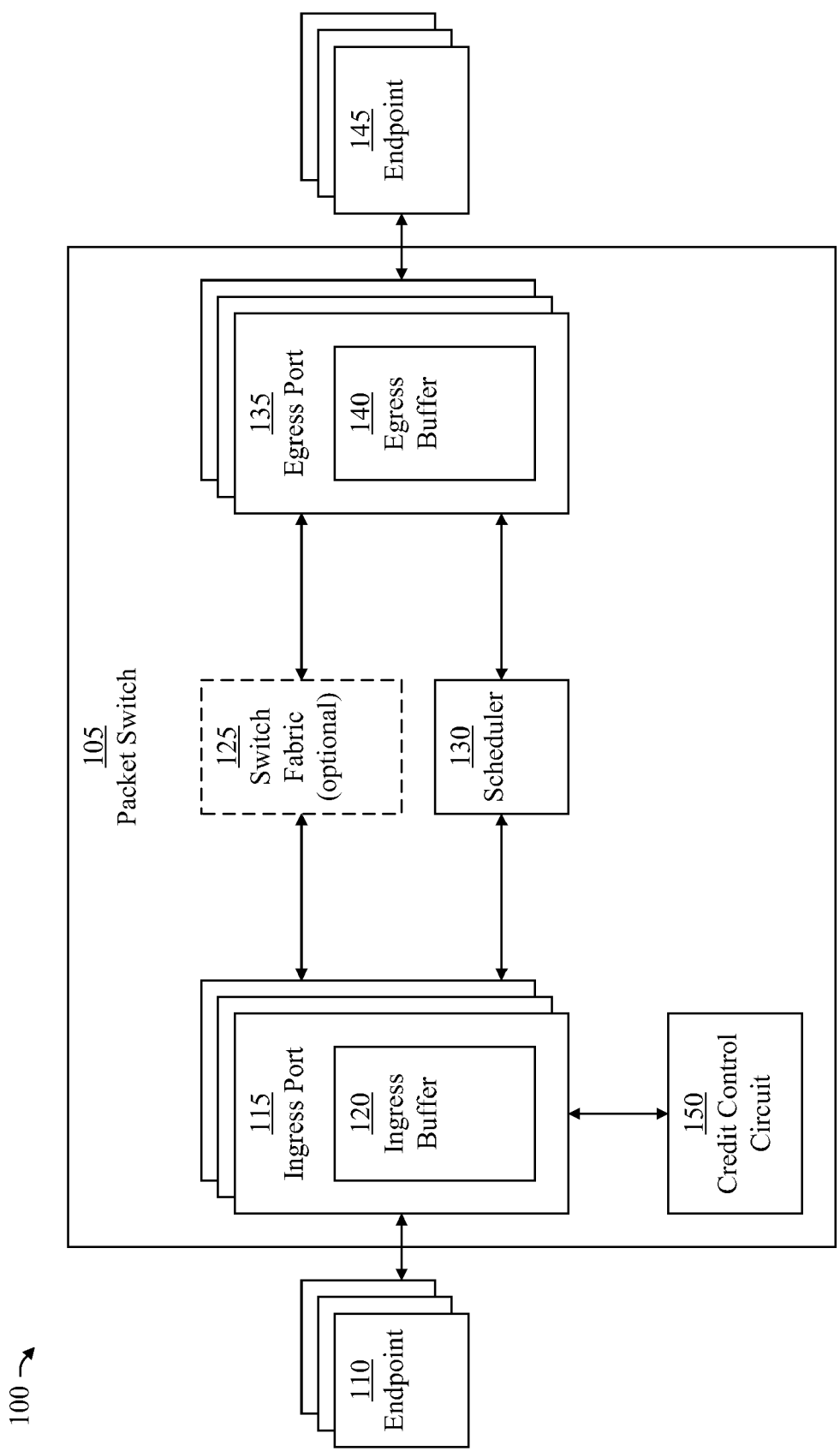
FIG. 1 illustrates a communication system, in accordance with an embodiment of the present invention.

FIG. 1 illustrates a communication system 100, in accordance with an embodiment of the present invention. The communication system 100 includes a packet switch 105, endpoints 110 (i.e., source endpoints), and endpoints 145 (i.e., destination endpoints). Each of the endpoints 110 and 145 is coupled (e.g., connected) to the packet switch 105. The packet switch 105 receives packets from the endpoints 110 and selectively routes the packets to the endpoints 145 based on contents of the packets. For example, a packet routed by the packet switch 105 may include a destination identifier that identifies an egress port 145 as a destination of the packet. As another example, the packet switch 105 may determine a destination of the packet based on a transaction identifier that identifies a transaction type of the packet. The packet switch 105 controls the flow of packets through the packet switch 105 by issuing credits to the endpoints 110 indicating the ability of the ingress ports 115 to accept (i.e., store) packets from the endpoints 110, as is described more fully herein. In some embodiments, the packet switch 105 also controls the flow of packets through the packet switch 105 based on the transaction types of the packets, as is also described more fully herein.

Each of the endpoints 110 and 145 is a source or destination of a communication in the communication system 100. For example, the endpoints 110 may be input devices that initiate packet based communications (e.g., transactions) and the endpoints 145 may be output devices that receive packet based communications. In some embodiments, an endpoint 110 or 145 in the communication system 100 may be both a source endpoint for initiating a packet based communication and a destination endpoint for receiving a packet based communication. For example, an endpoint 110 may be both an input device and an output device (e.g., an input-output device).

In various embodiments, the packet switch 105 includes ingress ports 115, an optional switch fabric 125, a scheduler 130, egress ports 135, and a credit control circuit 150. Each of the ingress ports 115 includes an ingress buffer 120 and is coupled (e.g., connected) to the switch fabric 125, the scheduler 130, and the credit control circuit 150. Each of the egress ports 135 includes an egress buffer 140 and is coupled (e.g., connected) to the switch fabric 125 and the scheduler 130. The switch fabric 125 may be any type of switch for routing packets. For example, the switch fabric 125 may be a crossbar switch. The credit control circuit 150 may include any circuitry for allocating credits for the ingress ports 115 and issuing the credits to the endpoints 110. For example, the credit control circuit 150 may include a central processing unit (CPU), a microprocessor, a microcontroller, an embedded processor, an embedded controller, synchronous logic, asynchronous logic, or the like.

In various embodiments, the credit control circuit 150 allocates credits for an ingress port 115 based on a storage capacity of the ingress buffer 120 in the ingress port 115 and issues the credits to the endpoint 110 corresponding to the ingress port 115, as is described more fully herein. Additionally, the credit control circuit 150 identifies credits consumed by the endpoint 110 corresponding to the ingress port 115 as well as credits that have become available (e.g., released) as a result of packets routed from the ingress port 115 to an egress port 135 of the packet switch 105, as is also described more fully herein.

In various embodiments, an endpoint 110 determines whether a corresponding ingress port 115 is able to accept (i.e., store) a packet based on the credits issued by the ingress port 115 to the endpoint 110. If the endpoint 110 determines that the ingress port 115 is able to accept the packet, the endpoint 110 provides (e.g., transmits) the packet to the ingress port 115. Otherwise, if the endpoint 110 determines that the corresponding ingress port 115 is not able to accept the packet, the endpoint 110 does not provide the packet to the ingress port 115. In some cases, an ingress port 115 may receive a packet from the corresponding endpoint 110 and reject the packet instead of accepting the packet. For example, the ingress port 115 may reject a packet received from the corresponding endpoint 110 if the packet is corrupt or the ingress buffer 120 of the ingress port 115 does not have available storage capacity for storing the packet.

The scheduler 130 identifies packets stored in the ingress buffers 120 of the ingress ports 115 and identifies at least one egress port 135 for each selected packet as a destination egress port 135 for the packet. Additionally the scheduler 130 schedules each of the selected packets for routing to each destination egress port 135 of the packet. In embodiments including the switch fabric 125, the switch fabric 125 routes each selected packet to the destination egress port 135 of the packet. In embodiments without the switch fabric 125, each ingress port 115 includes logic for switching (e.g., routing) a packet selected by the scheduler 130 to the destination egress port 135 of the selected packet.

In some embodiments, an ingress port 115 receives a packet from the corresponding endpoint 110 and writes (i.e., stores) the packet into the ingress buffer 120 of the ingress port 115 based on the transaction type of the packet. In turn, the ingress buffer 120 of the ingress port 115 stores the packet. Further, the scheduler 130 selects packets stored in the ingress buffers 120 for routing to the egress ports 135 and identifies one or more of the egress ports 135 as a destination egress port 135 for each of the selected packets, for example based on a destination identifier in the selected packet.

In various embodiments, the scheduler 130 selects packets for routing in a scheduling cycle and the packet switch 105 routes the packets to the corresponding destination egress ports 135 in a routing cycle following the scheduling cycle. For example, the scheduling cycle and the routing cycle may be successive clocks cycles of a clock signal in the packet switch 105. In some embodiments, the switch fabric 125 may route a packet from an ingress port 115 to an egress port 135 by routing portions of the packet in successive clock cycles of a clock signal in the packet switch 105 (e.g., successive routing cycles). In this way, the switch fabric 125 routes the packet from the ingress port 115 to the egress port 135 without inserting idle symbols into the packet. In various embodiments, the egress port 135 receiving the packet writes (i.e., stores) the packet into the egress buffer 140 of the egress port 135 and outputs the packet to the endpoint 145 corresponding (e.g., coupled) to the egress port 135.

In some embodiments, the transaction types of the packets routed by the packet switch 105 include posted transactions, non-posted transactions, and completion transactions. In some embodiments, the packet switch 105 is compliant with a Peripheral Component Interconnect Express™ (PCIe) standard maintained by the Peripheral Component Interconnect Special Interest Group (PCI-SIG). For example, the PCIe standard may be the PCIe Base 2.0 specification or the PCIe Base Revision 2.1 specification.

In various embodiments, the packet switch 105 may be coupled (e.g., connected) to a link partner and communicate with the link partner. For example, the link partner may be an endpoint 115, an endpoint 145, or another packet switch (e.g., another packet switch 105). As another example, the link partner may be a root complex as is described more fully herein. Generally, the link partner may be any system or device that transmits packets to the packet switch 105 or receives packets from the packet switch 105, or both. Moreover, the packet switch 105 may issue credits to the link partner or receive credits issued from the link partner, or both. For example, the link partner may be coupled to an ingress port 115 and transmit packets to the ingress port 115. In this example, the ingress port 115 issues credits to the link partner for controlling transmission of packets from the link partner to the ingress port 115. As another example, the link partner may be coupled to an egress port 135 and receive packets from the egress port 135. In this example, the link partner issues credits to the egress port 135 for controlling transmission of packets from the egress port 135 to the link partner.

In some embodiments, the packet switch 105 is implemented in an integrated circuit of an integrated circuit device which may include an integrated circuit package containing the integrated circuit. In other embodiments, the packet switch 105 is implemented in more than one integrated circuit of an integrated circuit device which may include a multichip package containing the integrated circuits.

Figure 2:
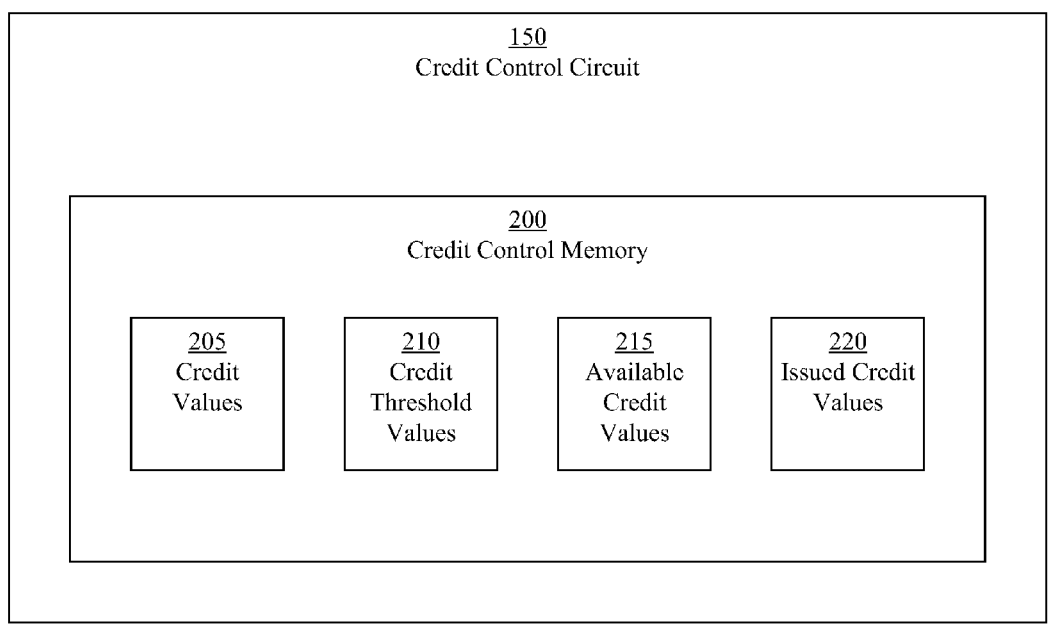
FIG. 2 illustrates a credit control circuit, in accordance with an embodiment of the present invention.

FIG. 2 illustrates the credit control circuit 150, in accordance with an embodiment of the present invention. The credit control circuit 150 includes a credit control memory 200 for storing credit values 205, credit threshold values 210 corresponding to the credit values 205, and available credit values 215 corresponding to the credit values 205. For example, the credit control memory 200 may be a random access memory (RAM). In various embodiments, the credit control circuit 150 allocates one or more credits to an ingress port 115 by writing (i.e., storing) a credit value 205 indicating the number of credits into the credit control memory 200. In further embodiments, the credit control circuit 150 generates a flow control packet including the credit value 205 and the ingress port 115 transmits the flow control packet to the corresponding link partner (e.g., endpoint 110). In this way, the ingress port 115 issues the number of credits indicated by the credit value 205 to the link partner.

In turn, the link partner determines whether the ingress port 115 is able to accept (e.g., store) a packet based on the number of credits indicated by the credit value 205 in the flow control packet. If the link partner determines the ingress port 115 is able to accept a packet, the link partner transmit the packet to the ingress port 115 and updates the credit value 205 in the link partner to indicate that the link partner consumed one or more of the credits issued by the ingress port 115. The ingress port 115 receives the packet from the link partner and writes (i.e., stores) the packet into the ingress buffer 120 of the ingress port 115.

In response, the credit control circuit 150 updates the credit value 205 stored in the credit control memory 200 to indicate that the link partner consumed one or more of the credits issued by the ingress port 115 to the link partner. In this way, the credit control circuit 150 updates the credit value 205 in response to the packet stored into the credit control memory 200. In some embodiments, the credit control circuit 150 updates the credit value 205 by decrementing the credit value 205 by the number of credits consumed by the link partner. In other embodiments, the credit control circuit 150 updates the credit value 205 by incrementing the credit value 205 by the number of credits consumed by the link partner.

Additionally, the credit control circuit 150 determines the available credit values 215 corresponding to the ingress ports 115 and stores the available credit values 215 into the credit control memory 200. Each of the available credit values 215 indicates a number of available credits for the corresponding ingress port 115. For example, the credit control circuit 150 may initialize a credit value 205 to zero to indicate that the ingress buffer 120 in the ingress port 115 does not have an additional credit available for issue to the link partner corresponding to the ingress port 115.

In various embodiments, the credit control circuit 150 identifies credits of an ingress port 115 that are released and thus have become available as a result of a packet routed from the ingress buffer 120 of the ingress port 115 to an egress port 135 of the packet switch 105. In these embodiments, one or more credits of the ingress port 115 are released for the ingress port 115 because at least a portion of the storage capacity of the ingress buffer 120 has become available for storing another packet. For example, the packet stored in the ingress buffer 120 may be deleted from the ingress buffer 120 of the ingress port 115 in the process or routing the packet to the egress port 135. Moreover, each of the released credits is a credit available to be issued to the link partner (i.e., an available credit) and the credit control circuit 150 updates the available credit value 215 of the ingress port 115 to indicate the number of available credits for the ingress port 115.

Additionally, the credit control circuit 150 determines a time of imminent credit starvation in the link partner by comparing the credit value 205 with the corresponding credit threshold value 210 to determine whether the credit value 205 has reached the credit threshold value 210. If the credit control circuit 150 determines that the credit value 205 has reached the credit threshold value 210, the credit control circuit 150 determines that the time of imminent credit starvation in the link partner will occur at a time in which the link partner would receive one or more additional credits presently issued to the link partner from the credit control circuit 150.

For example, the credit control circuit 150 may presently issue an additional credit to the link partner by generating a flow control packet for transmission to the link partner in a transmission period, which may be a clock cycle of a clock signal in the packet switch 105. Moreover, if one or more credits are available for the ingress port 115 (e.g., released credits), the credit control circuit 150 issues the credits to the link partner in response to determining the time of imminent credit starvation in the link partner. In turn, the link partner receives the issued credits at the time of imminent credit starvation in the link partner, which prevents credit starvation from occurring in the link partner. In this way, the credit control circuit 150 issues the credits to the link partner just in time to prevent credit starvation in the link partner.

For example, the time of imminent credit starvation in the link partner may occur in a first transmission period for transmitting a packet from the link partner to the ingress port 115. In this example, the first transmission period immediately precedes a second transmission period for transmitting a packet from the link partner to the ingress port 115 in which credit starvation would occur in the link partner if the link partner did not receive one or more additional credits in the first transmission period. In various embodiments, each of the first transmission period and the second transmission period is a clock cycle of a clock signal in the packet switch 105.

In some embodiments, the credit control circuit 150 determines that the credit value 205 has reached the credit threshold value 210 if the credit value 205 exceeds the credit threshold value 210. For example, the credit control circuit 150 may determine that the credit value 205 has reached the credit threshold value 210 if the credit value 205 is less than the credit threshold value 210. In another embodiment, the credit control circuit 150 determines the credit value 205 has reached the credit threshold value 210 if the credit value 205 is equal to or exceeds the credit threshold value 210. For example, the credit control circuit 150 may determine that the credit value 205 has reached the credit threshold value 210 if the credit value 205 is less than or equal to the credit threshold value 210.

In addition to issuing one or more additional credits to the link partner for arrival at the time of imminent credit starvation, the credit control circuit 150 updates one or more of the credit values 205 of the ingress port 115 and one or more of the corresponding available credit values 215 of the ingress port 115 to indicate that the available credits of the ingress port 115 are issued to the link partner. For example, the credit control circuit 150 may increment a credit value 205 of the ingress port 115 and decrement an available credit value 215 of the ingress port 115 to indicate an additional credit (e.g., a released credit) issued to the link partner corresponding to the ingress port 115. In various embodiments, the credit control circuit 150 generates a flow control packet (e.g., a flow control update packet) for transmission to the link partner indicating the number of additional credits issued to the link partner. For example, the credit control circuit 150 may generate the flow control packet including the credit values 205 of the ingress port 115. In this way, the credit control circuit 150 provides a credit update to the link partner. In some embodiments, the flow control packet also indicates a type of each additional credit issued to the link partner, as is described more fully herein.

In some embodiments, the credit control circuit 150 generates a flow control packet based on the available credit values 215. In this way, the credit control circuit 150 provides a credit update to the link partner based on the available credit values 215. For example, the credit control circuit 150 may generate the flow control packet including the available credit values 215 stored in the credit control memory 200 and then update the credit values 205 and the available credit values 215 stored in the credit control memory 200 to indicate the credits issued to the link partner.

In some embodiments, the credit control circuit 150 allocates credits for an ingress port 115 during an initialization of the ingress port 115 based on a storage capacity of the ingress port 115. Further, the credit control circuit 150 generates issued credits values 220 indicating the number of allocated credits for the ingress port 115, stores the issued credit values 220 into the credit control memory 200, and generates a flow control packet containing the issued credit values 220 for transmission to the link partner. In this way, the credit control circuit 150 issues the allocated credits to the link partner as initial credits and advertizes the initial credits to the link partner.

Additionally, the credit control circuit 150 updates the issued credits values 220 to indicate additional credits issued from the ingress port 115 to the link partner since the initialization of the ingress port 115. For example, the credit control circuit 150 may increment an issued credit value 220 to indicate the accumulative credits issued from the ingress port 115 to the link partner since the initialization of the ingress port 115. Moreover, the credit control circuit 150 generates a flow control update packet including the updated issued credit values 220 for transmission to the link partner. In this way, the credit control circuit 150 issues the additional credits to the link partner. In these embodiments, the link partner stores the issued credit values 220 contained in the flow control packet received from the ingress port 115 and updates (e.g., replaces) the issued credit values 220 stored in the link partner with the issued credit values 220 contained in a flow control update packet received from the ingress port 115 if the issued credit values 220 in the flow control update packet are different from the issued credit values 220 stored in the link partner.

Further in these embodiments, the link partner stores and maintains consumed credit values corresponding to the issued credit values 220, each of which indicates credits the link partner has consumed since initialization of the ingress port 115. Moreover, the link partner determines whether credits are available for transmitting a packet from the link partner to the ingress port 115 by determining a difference between the issued credit values 220 stored in the link partner and the corresponding consumed credit values stored in the link partner.

In further embodiments, the credit control circuit 150 maintains a maximum size for the issued credit values 220 and truncates an issued credit value 220 when the issued credit value 220 reaches (e.g., exceeds) a maximum issued credit value threshold. For example, the credit control circuit 150 may truncate a most significant bit of an issued credit value 220 that has reached a corresponding issued credit value threshold for the issued credit value 220. In these embodiments, the link partner determines when an issued credit value 220 has been truncated and adjusts (e.g., truncates) the corresponding consumed credit value stored in the link partner so that the difference between the issued credit value 220 and the corresponding consumed credit value indicates a number of issue credits available for transmitting a packet from the link partner to the ingress port 115.

In various embodiments, the credit control circuit 150 issues a maximum number of available credits to the link partner by generating a flow control packet for transmission to the link partner. For example, the credit control circuit 150 may generate the flow control packet indicating the maximum number of issued credits based on the credit values 205, the available credit values 215, or the issued credit values 220. In these embodiments, the packet switch 105 prevents credit starvation from occurring in the link partner by transmitting the flow control packet for arrival at the link partner proximate a time of imminent credit starvation of the link partner. Moreover, because the packet switch 105 issues the maximum number of available credits to the link partner in the flow control update packet, a time period between the time of imminent credit starvation and the next time of imminent credit starvation of the link partner 110 is maximized. As a result, the number of flow control update packets transmitted from the packet switch 105 to the link partner is reduced (e.g., minimized), which reduces (e.g., minimizes) consumption of bandwidth of the packet switch 105 for transmitting flow control update packets to the link partner.

In some embodiments, the credit control circuit 150 determines whether an idle transmission period exists for transmitting a packet from the ingress port 115 to the corresponding link partner. In these embodiments, an idle transmission period is a transmission period for transmitting a packet or a portion of a packet from the ingress port 115 to the corresponding link partner in which the ingress port 115 does not have a packet available for transmission to the link partner. For example, the idle transmission period may be a clock cycle of a clock signal in the packet switch 105. The credit control circuit 150 identifies the idle transmission period of the ingress port 115 and generates a flow control update packet for transmission from the ingress port 115 to the link partner in the idle transmission period of the ingress port 115. In turn, the ingress port 115 transmits the flow control update packet to the link partner in the idle transmission period of the ingress port 115 for arrival at the link partner in a transmission period of imminent credit starvation of the link partner.

In some embodiments, the credit control circuit 150 selects the credit threshold values 210 for an ingress port 115 based on a bandwidth of the ingress port 115. For example, the credit control circuit 150 may select an input bandwidth of an ingress port 115 by selecting an input data rate and an input data width of the ingress port 115 and select an output bandwidth of the ingress port 115 by selecting an output data rate and an output data width for the ingress port 115. Further in this example, the credit control circuit 150 selects the credit threshold values 210 for an ingress port 115 based on the bandwidth (e.g., the input bandwidth and the output bandwidth) of the ingress port 115.

In some embodiments, the credit control circuit 150 selects the credit values 205 of an ingress port 115 based on a round trip latency including a packet latency for transmitting a minimum sized packet from a link partner (e.g., an endpoint 110) to an ingress port 115 and a packet latency for transmitting a flow control update packet from the ingress port 115 to the link partner. Moreover, because the round trip latency depends upon the input bandwidth and output bandwidth of the ingress port 115, the credit control circuit 150 selects the credit values 205 of the ingress port 115 based on the bandwidth (e.g., the input bandwidth and the output bandwidth) of the ingress port 115 by selecting the credit values 205 based on the round trip latency.

For example, the credit values 205 of the ingress port 115 may indicate a number of transmission periods for transmitting a packet (e.g., a minimum sized packet) from the link partner to the ingress port 115 in addition to a number of transmission periods for transmitting a flow control packet from the ingress port 115 to the link partner. In this way, the credit control circuit 150 predicts the transmission period of imminent credit starvation in the link partner.

As another example, the credit values 205 of the ingress port 115 may indicate a number of transmission periods for transmitting a packet (e.g., a minimum sized packet) from the link partner to the ingress port 115, a number of transmission periods for transmitting a flow control packet from the ingress port 115 to the link partner, and a number of transmission periods for overhead. For example, the ingress port 115 or the link partner, or both, may include an input queue or an output queue, or both, for storing packets. In this example, the number of transmission periods for overhead may include one or more transmission periods accounting for propagation of a packet through one or more of the input or output queues.

Figure 3:
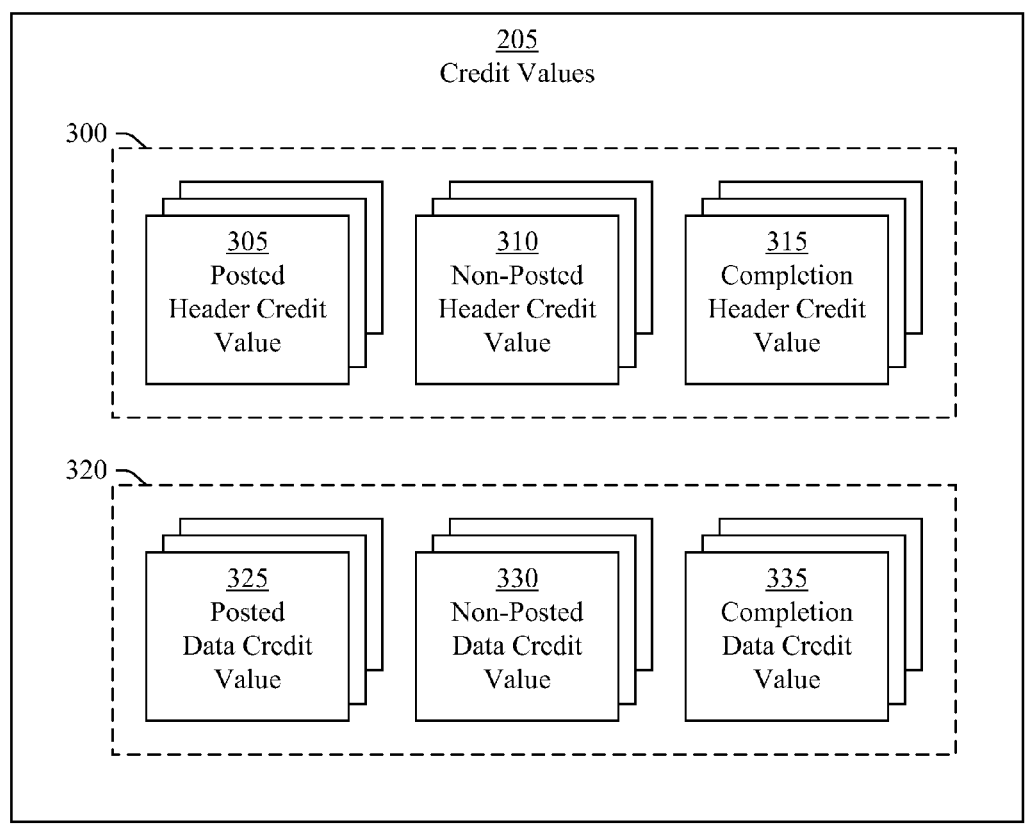
FIG. 3 illustrates credit values, in accordance with an embodiment of the present invention.

FIG. 3 illustrates the credit values 205, in accordance with an embodiment of the present invention. In this embodiment, the credit values 205 include header credit values 300 and data credit values 320. Each of the header credit values 300 indicates an available storage capacity of the ingress buffer 120 in a corresponding ingress port 115 for storing a packet header of a packet. Each of the data credit values 320 indicates an available storage capacity of the ingress buffer 120 in a corresponding ingress port 115 for storing at least a portion of a data payload of a packet. For example, a data credit value 320 may indicate an available storage capacity of the ingress buffer 120 for storing a data segment (e.g., a data byte or a data word) of a data payload of a packet.

In various embodiments, the credit control circuit 150 allocates header credits and data credits for an ingress buffer 120 of an ingress port 115 to transactions types of packets. In this way, the credit control circuit 150 allocates the storage capacity of the ingress buffer 120 of the ingress port 115 among the transaction types. The transaction types include a posted transaction, a non-posted transaction, and a completion transaction. For example, the transaction types may be specified in the PCIe Base 2.0 specification. Moreover, a posted packet has a posted transaction type, a non-posted packet has a non-posted transaction type, and a completion packet has a completion transaction type.

Furthermore, the packet switch 105 performs transactions including posted packets (i.e., packets having a posted transaction type), non-posted packets (i.e., packets having a non-posted transaction type), and completion packets (i.e., packets having a completion transaction type). A transaction in the packet switch 105 includes transmission (e.g., routing) of one or more packets through the packet switch 105 and may be a posted transaction or a non-posted transaction. A posted transaction includes transmission (e.g., routing) of a posted packet through the packet switch 105 but does not include transmission of a completion packet through the packet switch 105 in response to the transmission of the posted packet. A non-posted transaction includes transmission (e.g., routing) of a non-posted packet through the packet switch 105 and includes transmission of one or more completion packets though the packet switch 105 in response to the transmission of the non-posted packet.

In these embodiments, the credit control circuit 150 allocates posted header credits and posted data credits to posted transactions for an ingress port 115 by writing (i.e., storing) a posted header credit value 305 indicating a number of posted header credits into the credit control memory 200 for the ingress port 115 and writing (i.e., storing) a posted data credit value 325 indicating a number of posted data credits into the credit control memory 200 for the ingress port 115. Additionally, the credit control circuit 150 allocates non-posted header credits and non-posted data credits to non-posted transactions for an ingress port 115 by writing (i.e., storing) a non-posted header credit value 310 indicating a number of non-posted header credits into the credit control memory 200 for the ingress port 115 and writing (i.e., storing) a non-posted data credit value 330 indicating a number of non-posted data credits into the credit control memory 200 for the ingress port 115. Similarly, the credit control circuit 150 allocates completion header credits and completion data credits to completion transactions for an ingress port 115 by writing (i.e., storing) a completion header credit value 315 indicating a number of completion header credits into the credit control memory 200 for the ingress port 115 and writing (i.e., storing) a completion data credit value 335 indicating a number of completion data credits into the credit control memory 200 for the ingress port 115.

In various embodiments, the credit control circuit 150 generates flow control packets including the header credit values 300 and the data credit values 320 of an ingress port 115 and the ingress port 115 transmits the flow control packet to the link partner corresponding to the ingress port 115. In this way, the credit control circuit 150 issues credits to the link partner. In turn, the link partner determines based on the header credit values 300 and the data credit values 320 received from the ingress port 115 whether the ingress buffer 120 in the ingress port 115 has an available storage capacity for storing a packet of each of the transaction types.

If the link partner determines that the ingress buffer 120 of the ingress port 115 has an available storage capacity for storing a packet of a particular transaction type, the link partner may provide (e.g., transmit) a packet having the particular transaction type to the ingress port 115. Otherwise, if the link partner determines that the ingress buffer 120 of the ingress port 115 does not have an available storage capacity for storing a packet of the particular transaction type, the link partner does not provide a packet of the particular transaction type to the ingress port 115.

For example, the link partner may have a posted packet ready for transmission to the ingress port 115. In this example, a packet header of the posted packet will consume one header credit and a data payload of posted packet will consume three data credits. Moreover, the link partner receives a flow control packet including the posted header credit value 305 and the posted data credit value 325 from the ingress port 115 corresponding to the link partner. The link partner determines whether the number of posted header credits indicated by the posted header credit value 305 in the link partner is at least one and the number of data credits indicated by the posted data credit value 325 in the link partner is at least three. If the number of posted header credits indicated by the posted header credit value 305 in the link partner is at least one and the number of data credits indicated by the posted data credit value 325 in the link partner is at least three, the link partner transmits the posted packet to the ingress port 115, updates the posted header credit value 305 in the link partner to indicate consumption of one posted header credit, and updates the posted data credit value 325 in the link partner to indicate consumption of three posted data credits.

Further in this example, the ingress port 115 receives the posted packet from the link partner and the credit control circuit 150 determines whether the number of posted header credits indicated by the posted header credit value 305 stored in the credit control memory 200 for the ingress port 115 is at least one and the number of data credits indicated by the posted data credit value 325 stored in the credit control memory 200 for the ingress port 115 is at least three. If the number of posted header credits indicated by the posted header credit value 305 stored in the credit control memory 200 for the ingress port 115 is at least one and the number of data credits indicated by the posted data credit value 325 stored in the credit control memory 200 for the ingress port 115 is at least three, the ingress port 115 stores the packet into the ingress buffer 120 of the ingress port 115. In this way, the ingress port 115 accepts the packet. Moreover, the credit control circuit 150 updates the posted header credit value 305 in the credit control memory 200 to indicate consumption of one posted header credit by the link partner and updates the posted data credit value 325 in the credit control memory 200 to indicate consumption of three posted data credits by the link partner.

Figure 4:
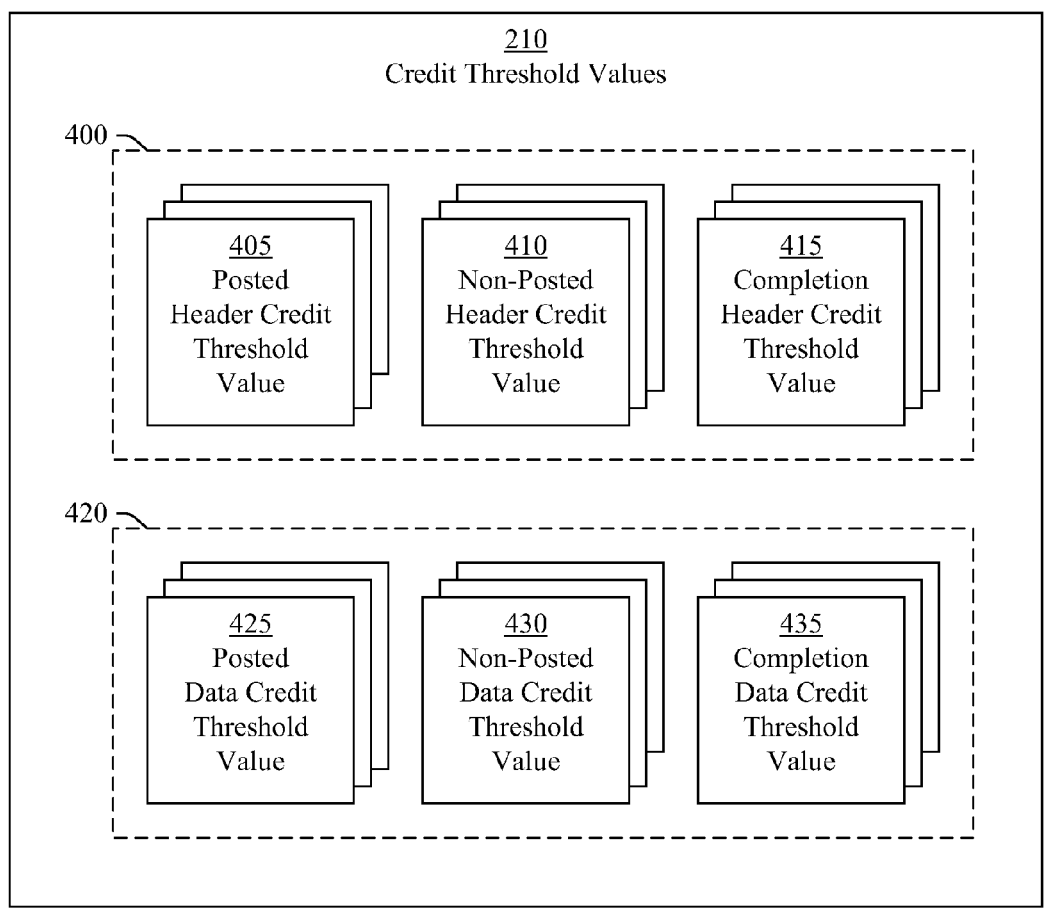
FIG. 4 illustrates credit threshold values, in accordance with an embodiment of the present invention.

FIG. 4 illustrates the credit threshold values 210, in accordance with an embodiment of the present invention. The credit threshold values 210 include header credit threshold values 400 and data credit threshold values 420. Each of the header credit threshold values 400 corresponds to a header credit value 300 and each of the data credit threshold values 420 corresponds to a data credit value 320.

In this embodiment, the header credit threshold values 400 include posted header credit threshold values 405 corresponding to the posted header credit values 305, non-posted header credit threshold values 410 corresponding to the non-posted header credit values 310, and completion header credit threshold values 415 corresponding to the completion header credit values 315. The data credit threshold values 420 include posted data credit threshold values 425 corresponding to the posted data credit values 325, non-posted data credit threshold values 430 corresponding to the non-posted data credit values 330, and completion data credit threshold values 435 corresponding to the completion data credit values 335.

In various embodiments, the credit control circuit 150 predicts a time of imminent credit starvation in a link partner (e.g., an endpoint 110) for a particular transaction type in which a packet is a header packet (i.e., a packet containing a packet header but not containing a data payload) by determining that the header credit value 300 of the particular transaction type for the ingress port 115 has reached the corresponding header credit threshold value 400 of the particular transaction type for the ingress port 115. For example, the credit control circuit 150 may predict a time of imminent credit starvation in a link partner (e.g., an endpoint 110) for a non-posted packet containing a packet header but not containing a data payload by determining that the non-posted header credit value 310 for the ingress port 115 has reached the corresponding non-posted header credit threshold value 410 for the ingress port 115.

In these embodiments, the credit control circuit 150 predicts a time of imminent credit starvation in a link partner (e.g., an endpoint 110) for a particular transaction type in which a packet is a data packet (i.e., a packet containing a packet header and a data payload) by determining that the header credit value 300 of the particular transaction type for the ingress port 115 has reached the corresponding header credit threshold value 400 of the particular transaction type for the ingress port 115 or that the data credit value 320 of the particular transaction type for the ingress port 115 has reached the data credit threshold value 420 of the particular transaction type for the ingress port 115. For example, the credit control circuit 150 may predict a time of imminent credit starvation in a link partner (e.g., an endpoint 110) for a posted packet containing a packet header and a data payload by determining that the posted header credit value 305 of the ingress port 115 has reached the corresponding posted header credit threshold value 405 of the ingress port 115 or determining that the posted data credit value 325 of the ingress port 115 has reached the corresponding posted data credit threshold value 425, or both.

Figure 5:
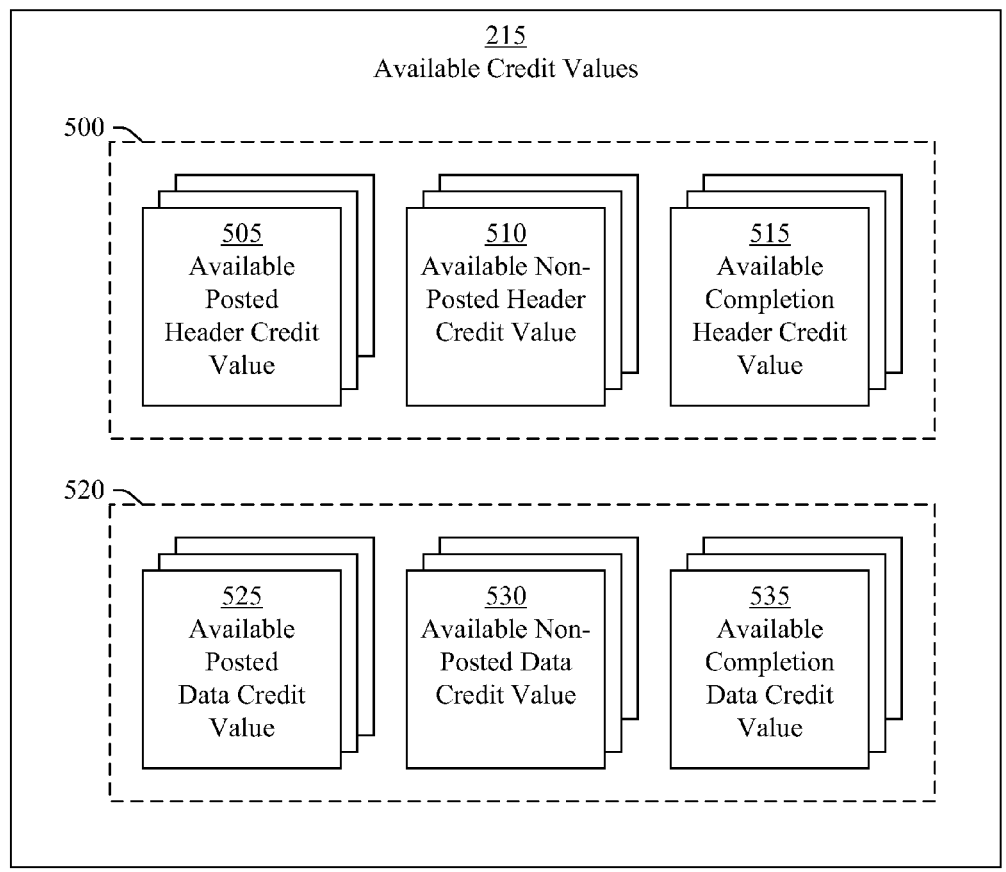
FIG. 5 illustrates available credit values, in accordance with an embodiment of the present invention.

FIG. 5 illustrates the available credit values 215, in accordance with an embodiment of the present invention. The available credit values 215 include available header credit values 500 and available data credit values 520. Each of the available header credit values 500 corresponds to a header credit value 300 and each of the available data credit values 520 corresponds to a data credit value 320.

In this embodiment, the available header credit values 500 include available posted header credit values 505 corresponding to the posted header credit values 305, available non-posted header credit values 510 corresponding to the non-posted header credit values 310, and available completion header credit values 515 corresponding to the completion header credit values 315. The available data credit values 520 include available posted data credit values 525 corresponding to the posted data credit values 325, available non-posted data credit values 530 corresponding to the non-posted data credit values 330, and available completion data credit values 535 corresponding to the completion data credit values 335.

In this embodiment, the credit control circuit 150 updates the available header credit value 500 of a particular transaction type for an ingress port 115 to indicate that a header credit of the particular transaction type has been released and is available for issue to the link partner corresponding to the ingress port 115. Additionally, the credit control circuit 150 updates the available data credit value 520 of a particular transaction type for an ingress port 115 to indicate that a data credit of the particular transaction type has been released and is available for issue to the link partner corresponding to the ingress port 115.

The credit control circuit 150 releases a header credit or a data credit of a particular transaction type, or both, in response to deletion of a packet of the particular transaction type from the ingress buffer 120 of the ingress port 115. For example, the credit control circuit 150 may delete a packet from the ingress buffer 120 of the ingress port 115 that has been routed to an egress port 135. As another example, the credit control circuit 150 may determine a packet stored in the ingress buffer 120 of the ingress port 115 is a corrupt packet and delete the packet from the ingress buffer 120 without routing the packet to an egress port 135.

For example, the credit control circuit 150 may release a completion header credit for an ingress port 115 in response to deletion of a completion packet from the ingress buffer 120 of the ingress port 115. Further, the credit control circuit 150 updates the available completion header credit value 515 to indicate the released completion header credit is available for issue to the link partner corresponding to the ingress port 115. The credit control circuit 150 may then issue the released credit to the link partner corresponding to the ingress port 115, for example by generating a flow control packet indicating an issued credit for arrival at a time of imminent credit starvation in the link partner. Further in this example, the credit control circuit 150 updates the available completion header credit value 515 to indicate that the released credit is no longer available and updates the completion header credit value 315 corresponding to the available completion header credit value 515 to indicate that the released credit has been issued to the link partner.

Figure 6:
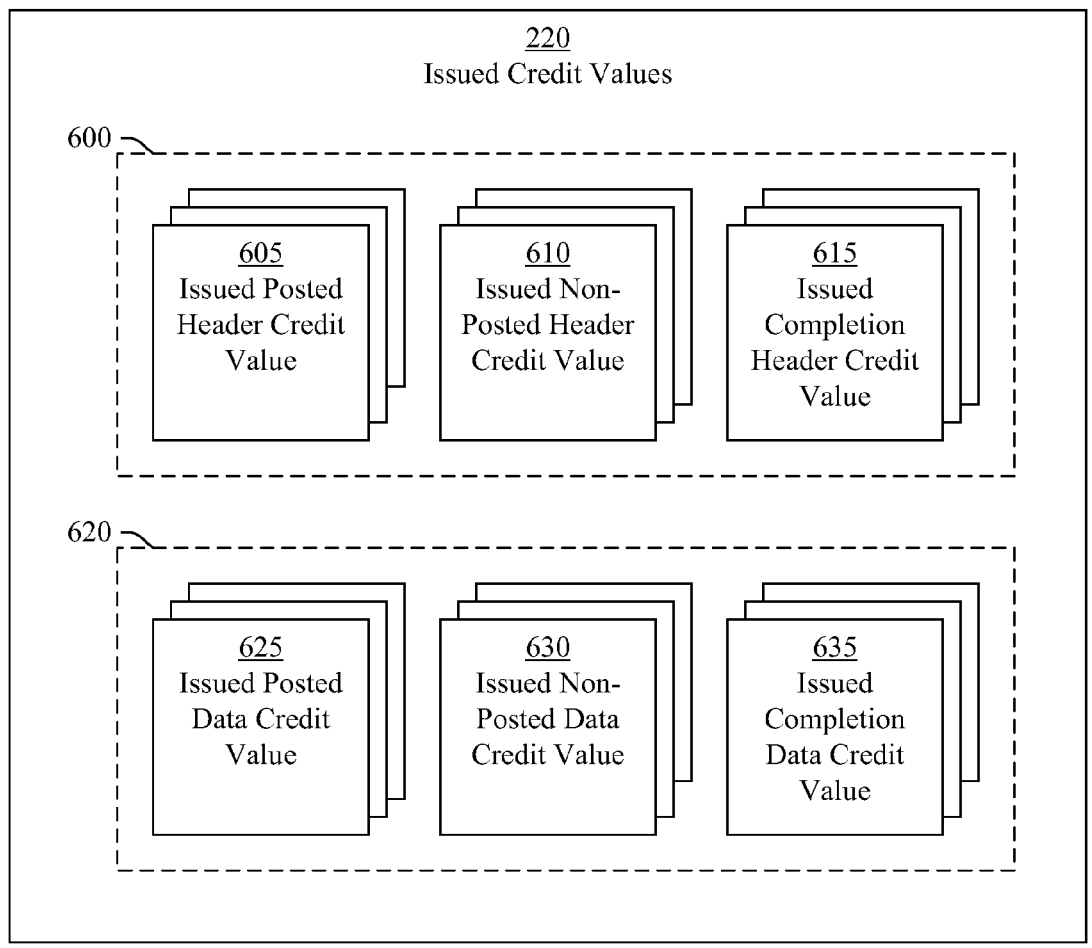
FIG. 6 illustrates issued credit values, in accordance with an embodiment of the present invention.

FIG. 6 illustrates the issued credit values 220, in accordance with an embodiment of the present invention. The issued credit values 220 include issued header credit values 600 and issued data credit values 620. Each of the issued header credit values 600 corresponds to a header credit value 300 and each of the issued data credit values 620 corresponds to a data credit value 320.

In this embodiment, the issued header credit values 600 include issued posted header credit values 605 corresponding to the posted header credit values 305, issued non-posted header credit values 610 corresponding to the non-posted header credit values 310, and issued completion header credit values 615 corresponding to the completion header credit values 315. The issued data credit values 620 include issued posted data credit values 625 corresponding to the posted data credit values 325, issued non-posted data credit values 630 corresponding to the non-posted data credit values 330, and issued completion data credit values 635 corresponding to the completion data credit values 335.

In this embodiment, the credit control circuit 150 updates the issued header credit value 600 of a particular transaction type for an ingress port 115 to indicate that a header credit of the particular transaction type has been issued to the link partner corresponding to the ingress port 115. Additionally, the credit control circuit 150 updates the issued data credit value 620 of a particular transaction type for an ingress port 115 to indicate that a data credit of the particular transaction type has been issued to the link partner corresponding to the ingress port 115.

Figure 7:
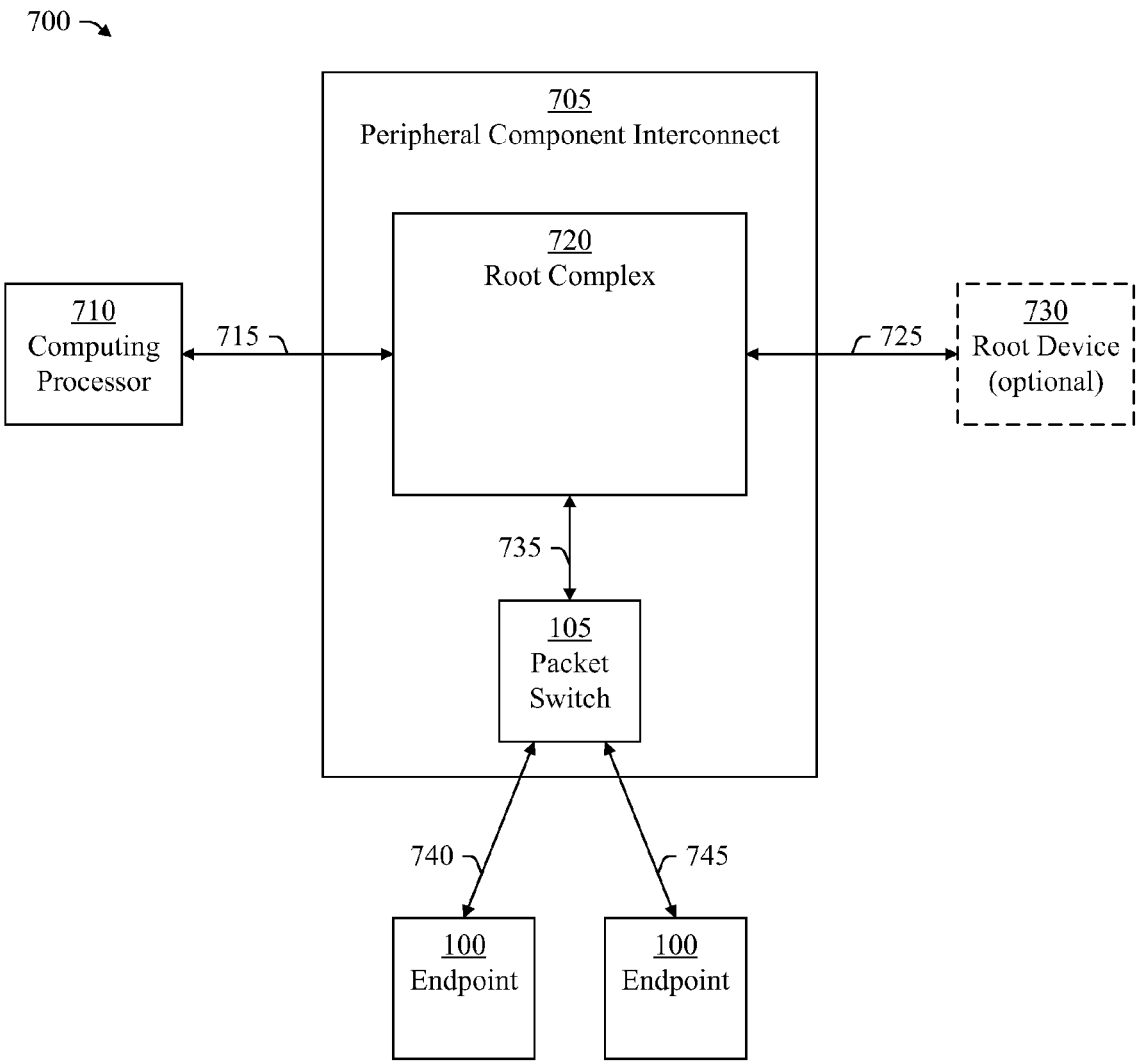
FIG. 7 illustrates a computing system, in accordance with an embodiment of the present invention.

FIG. 7 illustrates a computing system 700, in accordance with an embodiment of the present invention. The computing system 700 includes a peripheral component interconnect 705, a computing processor 710, and an optional root device 730. The computing processor 710 is coupled (e.g., connected) to the peripheral component interconnect 705 through a communication link 715. The root device 730 is coupled (e.g., connected) to the peripheral component interconnect 705 through a communication link 725.

The computing processor 710 may be any circuit for executing instructions or computer code. For example, the computing processor 710 may be a central processing unit (CPU), a microprocessor, a microcontroller, an embedded processor, an embedded controller, or the like. The root device 730 may be any circuit accessed by the computing processor 710. In some embodiments, the root device 730 is a memory system for storing instructions or data, for the computing processor 710, or both. For example, the root device 730 may include a random access memory (RAM), a read-only memory (ROM), a flash storage (e.g., flash memory), a disk storage drive, or the like.

In various embodiments, the peripheral component interconnect 705 includes the packet switch 105 and a root complex 720 coupled (e.g., connected) to the packet switch 105. The root complex 720 is coupled to the computing processor 710 through the communication link 715 and to the packet switch 105 through a communication link 735. The communication link 735 includes one or more data links. For example, the communication link 735 may include one or more serial data links. The peripheral component interconnect 705 facilitates communications between computing processor 710 and the root complex 720 and facilitates packet based communications between the root complex 720 and the packet switch 105. In various embodiments, the peripheral component interconnect 705 facilitates packet based communications or non-packet based communication, or both, between the computing processor 710 and the root complex 720.

In addition to the peripheral component interconnect 705, the computing processor 710, and the root device 730, the computing system 700 includes endpoints 110. In the embodiment of FIG. 7, the computing system 700 includes a downstream endpoint 110 coupled to the packet switch 105 through a communication link 740 and a downstream endpoint 110 coupled to the packet switch 105 through the communication link 745. Each of the communication links 740 and 745 includes one or more data links, for example serial data links. Moreover, the peripheral component interconnect 705 facilitates packet based communications between the root complex 720 and the endpoints 110 through the respective communication links 740 and 745.

Although one root device 730 is illustrated in FIG. 7, the computing system 700 may include more or less than one root device 730 coupled to the root complex 720 in other embodiments. Although two downstream endpoints 110 are illustrated in FIG. 7, the computing system 700 may include more or less than two downstream endpoints 110 coupled to the packet switch 105 in other embodiments.

In some embodiments, the peripheral component interconnect 705 is compliant with a Peripheral Component Interconnect Express™ (PCIe) standard maintained by the Peripheral Component Interconnect Special Interest Group (PCI-SIG). For example, the PCIe standard may be the PCIe Base 2.0 specification or the PCIe Base Revision 2.1 specification, each of which is incorporated herein by reference. In some embodiments, the computing system 700 is implemented in an integrated circuit of an integrated circuit device which may include an integrated circuit package containing the integrated circuit. In other embodiments, the computing system 700 is implemented in more than one integrated circuit of an integrated circuit device which may include a multichip package containing the integrated circuits.

In some embodiments, the peripheral component interconnect 705 is implemented in an integrated circuit of an integrated circuit device which may include an integrated circuit package containing the integrated circuit. In other embodiments, the peripheral component interconnect 705 is implemented in more than one integrated circuit of an integrated circuit device which may include a multichip package containing the integrated circuits.

In some embodiments, the computing system 700 includes a link partner other than the root complex 720 and the endpoints 110, which is coupled (e.g., connected) to the packet switch 105. For example, the link partner may be another packet switch (e.g., another packet switch 105) or another root complex (e.g., another root complex 720). In various embodiments, the computing system 700 may include any combination of links partners coupled to the packet switch 105 for controlling packet based communication between each of the link partners and the packet switch 105.

Figure 8:
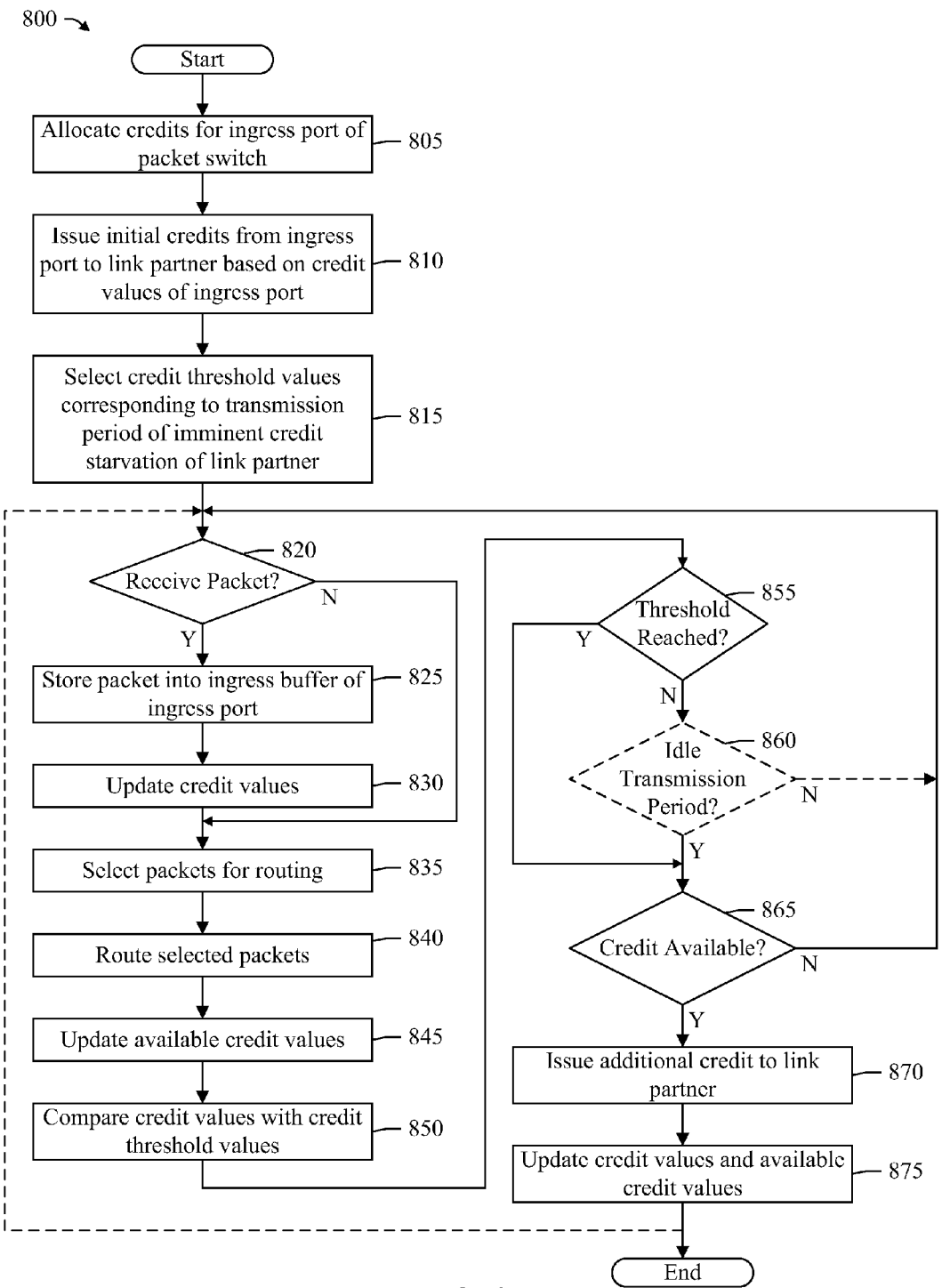
FIG. 8 illustrates a method of controlling packet flow in a packet switch, in accordance with an embodiment of the present invention.

FIG. 8 illustrates a method 800 of controlling packet flow in a packet switch, in accordance with an embodiment of the present invention. In step 805, credits are allocated for an ingress port of a packet switch. In various embodiments, the credit control circuit 150 allocates credits for an ingress port 115 of the packet switch 105.

In some embodiments, the credit control circuit 150 allocates credit for the ingress port 115 by allocating a number of header credits and a number of data credits for the ingress port 115. In these embodiments, the credit control circuit 150 allocates the credits for the ingress port 115 by writing (i.e., storing) one or more credit values 205 into the credit control memory 200. For example, the credit control circuit 150 may allocate a number of header credits for the ingress port 115 by writing (i.e., storing) a header credit value 300 indicating the number of header credits into the credit control memory 200 of the credit control circuit 150. Further in this example, the credit control circuit 150 may allocate a number of data credits for the ingress port 115 by writing (i.e., storing) a data credit value 320 indicating the number of data credits into the credit control memory 200 of the credit control circuit 150.

In some embodiments, the credit control circuit 150 allocates credits to transaction types for the ingress port 115. For example, the transaction types may include posted transactions, non-posted transactions, and completion transactions. Moreover, the credit control circuit 150 allocates the credits to the transaction types for the ingress port 115 by writing (i.e., storing) header credit values 300 and data credit values 320, each of which is associated with one of the transaction types, into the credit control memory 200 of the credit control circuit 150. Each of the header credit values 300 indicates a number of header credits for storing packet headers of packets associated with the transaction type of the header credit value 300 in the ingress buffer 120 of the ingress port 115. Each of the data credit values 320 indicates a number of data credits for storing data payloads of packets associated with the transaction type of the data credit value 320 in the ingress buffer 120 of the ingress port 115. For example, each of the data credit values 320 may indicate a number of data credits for storing a number of data segments (e.g., data bytes or data words) of a data payload of a packet. The method 800 then proceeds to step 810.

In step 810, initial credits are issued from the ingress port to a link partner based on credit values of the ingress port. In various embodiments, the credit control circuit 150 issues initial credits from the ingress port 115 to the link partner corresponding (e.g., coupled) to the ingress port 115 based on the credit values 205 of the ingress port 115. For example, the link partner may be an endpoint 110, a root complex 620, or another packet switch 105. In some embodiments, the credit control circuit 150 issues the initial credits to the link partner by generating a flow control packet indicating the number of issued credits. For example, the flow control packet may include the credit values 205 of the ingress port 115, the available credit values 215 of the ingress port 115, or the issued credit values 220 of the ingress port 115. In turn, the ingress port 115 transmits the flow control packet to the link partner.

In various embodiments, the credit values 205 include header credit values 300 and data credit values 320. The header credit values 300 indicate a number of header credits issued to the link partner that have not been consumed by the link partner. The data credit values 320 indicate a number of data credits issued to the link partner that have not been consumed by the link partner (i.e., outstanding credits). In some embodiments, the header credit values 300 include posted header credit values 305, non-posted header credit values 310, and completion header credit values 315 indicating a corresponding number of posted header credits, non-posted header credits, and completion header credits issued to the link partner that have not been consumed by the link partner (i.e., outstanding credits). In some embodiments, the data credit values 320 include posted data credit values 325, non-posted data credit values 330, and completion data credit values 335 indicating a corresponding number of posted data credits, non-posted data credits, and completion data credits issued to the link partner that have not been consumed by the link partner. The method 800 then proceeds to step 815.

In step 815, credit threshold values corresponding to a transmission period of imminent credit starvation of the link partner are selected. In various embodiments, the credit control circuit 150 selects the credit threshold values 210 corresponding to a transmission period of imminent credit starvation of the link partner. For example, the transmission period of imminent credit starvation of the link partner may be one or more clock cycles of a clock signal in the link partner for transmitting packets from the link partner to the ingress port 115.

In various embodiments, the transmission period of imminent credit starvation of the link partner immediately precedes a subsequent transmission period of the link partner in which credit starvation could occur in the link partner if the link partner does not receive one or more additional credits from the ingress port 115 in the transmission period of imminent credit starvation. In these embodiments, the credit control circuit 150 circuit predicts the transmission period of imminent credit starvation in the link partner based on a round trip latency including a packet latency for transmitting a minimum sized packet from the link partner to the ingress port 115 and a packet latency for transmitting a flow control update packet from the ingress port 115 to the link partner. Moreover, if the link partner transmits only minimum sized packets (e.g., header packets) to the ingress port 115, the transmission period of imminent credit starvation of the link partner immediately precedes a subsequent transmission period of the link partner in which credit starvation would occur in the link partner if the link partner does not receive one or more additional credits from the ingress port 115 in the transmission period of imminent credit starvation.

Otherwise, if the link partner does not transmit only minimum sized packets to the ingress port 115 in these embodiments, the transmission period of imminent credit starvation of the link partner will precede and be proximate to a subsequent transmission period of the link partner in which credit starvation could occur in the link partner if the link partner does not receive one or more additional credits from the ingress port 115 in the transmission period of imminent credit starvation. In either case, credit starvation may be prevented in the link partner by issuing additional credits from the ingress port 115 to the link partner for arrival at the transmission period of imminent credit starvation for the link partner. In this way, the transmission period of imminent credit starvation of the link partner is a predicted transmission period of imminent credit starvation of the link partner.

In one embodiment, the transmission period of imminent credit starvation precedes the transmission period of credit starvation by a number of transmission periods. Moreover, the number of transmission periods between the transmission period of imminent credit starvation and the transmission period of credit starvation may be up to a difference between a number of transmission periods needed to transmit a maximum sized packet from the link partner to the ingress port 115 and a number of transmission periods needed to transmit a minimum sized packet from the link partner to the ingress port 115. In this embodiment, the number of transmission periods between the transmission period of imminent credit starvation and the transmission period of credit starvation is in a range from zero to the difference between the number of transmission periods needed to transmit the maximum sized packet and the number of transmission periods needed to transmit the minimum sized packet. The method 800 then proceeds to step 820.

In step 820, it is determined whether a packet is received from the link partner at the ingress port. In various embodiments, the credit control circuit 150 determines whether the ingress port 115 receives a packet from the link partner. For example, the credit control circuit 150 may determine whether the ingress port 115 receives a packet in a scheduling cycle, a routing cycle, or a transmission cycle of the ingress port 115.

In various embodiments, the link partner determines based on the issued credits of the ingress port 115 whether the ingress port 115 is able to accept a packet before the link partner transmits the packet to the ingress port 115. If the link partner determines that the ingress port 115 is able to accept the packet, the link partner transmits the packet to the ingress port 115. Otherwise, if the link partner determines that the ingress port 115 is not able to accept the packet, the link partner does not transmit the packet to the ingress port 115 until the link partner receives additional credits sufficient for transmitting the packet to the ingress port 115. If the ingress port 115 receives a packet, the method 800 proceeds to step 825. Otherwise, the method 800 proceeds to step 835.

In step 825, the packet is stored into an ingress buffer of the egress port. In various embodiments, the ingress port 115 stores the packet received from the link partner into the ingress buffer 120 of the ingress port 115. The method 800 then proceeds to step 830.

In step 830, the credit values are updated to indicate credits consumed by the link partner as the packet is received at the ingress port. In various embodiments, the credit control circuit 150 updates the credit values 205 to indicate a number of credits consumed by the link partner as the packet is received at the ingress port 115. For example, the credit control circuit 150 may update the credit values 205 of the ingress port 115 in response to the ingress port 115 receiving and storing the packet. Moreover, the credit control circuit 150 may update the credit values 205 of the ingress port 115 to indicate the number of credits consumed by the link partner by modifying (e.g., incrementing or decrementing) the credit values 205 to indicate the numbers of credits issued to the link partner but not consumed by the link partner (i.e., outstanding credits).

Additionally, the link partner determines the number of the credits consumed by the link partner in transmitting the packet to the ingress port 115. For example, the link partner may determine the number of credits consumed by the link partner based on the size (e.g., number of data bytes or data words) of packet transmitted from the link partner to the ingress port 115. As another example, the link partner may determine the number of credits consumed by the link partner based on the number of transmission periods in which the link partner transmits the packet to the ingress port 115. The method 800 then proceeds to step 835.

In step 835, arrived at either from step 820 in which it was determined that the ingress port did not receive a packet from the link partner or from step 830 in which the credit values are updated, packets are selected for routing from ingress ports to egress ports of the packet switch. In various embodiments, the scheduler 130 selects one or more packets stored in the ingress ports 115 of the packet switch 105 for routing to the egress ports 135 of the packet switch 105. Additionally, the scheduler 130 identifies one or more of the egress ports 135 for each selected packet as a destination egress port 135 for the selected packet. The method 800 then proceeds to step 840.

In step 840, the selected packets are routed to the egress ports of the packet switch. In various embodiments, the switch fabric 125 routes each selected packet to each destination egress port 135 of the packet. In embodiments without the switch fabric 125, the ingress ports 115 switch (e.g., route) the selected packets to each destination egress port 135 of the packet. The method 800 then proceeds to step 845.

In step 845, available credit values are updated as the selected packets are routed from the ingress ports to the destination egress ports. In various embodiments, the credit control circuit 150 updates the available credit values 215 as the selected packets are routed from the ingress ports 115 to the destination egress ports 135 of the selected packets. In this way, the credit control circuit 150 updates the available credit values 215 to indicate consumed credits that have become available. For example, the credit control circuit 150 may update the available credit values 215 by modifying (e.g., incrementing or decrementing) an available credit value 215 of the ingress port 115 to indicate that a credit consumed by the link partner corresponding to the ingress port 115 has become available as a result of the packet being routed from the ingress port 115 to the destination egress port 135 of the packet. The method 800 then proceeds to step 850.

In step 850, the updated credit values are compared with the credit threshold values. In various embodiments, the credit control circuit 150 compares the updated credit values 205 with the credit threshold values 210 by comparing each credit value 205 to the credit threshold value 210 corresponding to the credit value 205. The method 800 then proceeds to step 855.

In step 855, it is determined whether a credit value has reached a corresponding credit threshold value. In various embodiments, the credit control circuit 150 determines whether a credit value 205 has reached the corresponding credit threshold value 210. In this way, the credit control circuit 150 determines whether any of the credit values 205 has reached the credit threshold value 210 corresponding to that credit value 205.

In embodiments including header credit values 300 and data credit values 320, the credit control circuit 150 compares each header credit value 300 of the ingress port 115 to a corresponding header credit threshold value 400 of the ingress port 115 to determine whether the header credit value 300 has reached the corresponding header credit threshold value 400. Further, the credit control circuit 150 compares each data credit value 320 of the ingress port 115 to a corresponding data credit threshold value 420 of the ingress port 115 to determine whether the data credit value 320 has reached the corresponding data credit threshold value 420. If one or more of the credit values 205 has reached a corresponding credit threshold value 210, the method 800 proceeds to step 865. Otherwise, the method 800 proceeds to step 860.

In optional step 860, it is determined whether an idle transmission period exists for transmitting a flow control update packet from the ingress port to the corresponding link partner. In various embodiments, the credit control circuit 150 determines whether an idle transmission period exists for transmitting a flow control update packet from the ingress port 115 to the corresponding link partner. Generally, an idle transmission period is a transmission period for transmitting a packet or a portion of a packet from the ingress port 115 to the corresponding link partner in which the ingress port 115 does not have a packet other than a flow control packet available for transmission to the link partner. For example, the idle transmission period may be a clock cycle of a clock signal in the packet switch 105. Moreover, the credit control circuit 150 identifies idle transmission periods in the ingress port 115. If the credit control circuit 150 identifies an idle transmission period for the ingress port 115, the method 800 proceeds to step 865. Otherwise, the method 800 returns to step 820.

In step 865, arrived at either from the step 855 in which it was determined that a credit value has reached a corresponding credit threshold value or from step 860 in which an idle transmission period was identified in the ingress port, it is determined whether the ingress port has an available credit. In various embodiments, the credit control circuit 150 determines whether the ingress port 115 has one or more available credits based on the available credit values 215 of the ingress port 115. If it is determined that the ingress port 115 has at least one available credit, the method 800 proceeds to step 870. Otherwise, the method 800 returns to step 820.

In step 870, an additional credit is issued to the link partner. In various embodiments, the credit control circuit 150 issues an additional credit to the link partner corresponding to the ingress port 115. For example, the additional credit issued to the link partner may be an available credit of the ingress port 115 as indicated by an available credit value 215 of the ingress port 115. In this example, the additional credit is a credit previously issued and consumed by the link partner that has been released and is being reissued to the link partner. In various embodiments, the credit control circuit 150 issues the additional credit to the link partner by issuing one or more available credits of the ingress port 115 to the link partner. For example, the credit control circuit 150 may issue a maximum number of available credits of the ingress port 115 to the link partner.

In various embodiments, the credit control circuit 150 issues each additional credit to the link partner corresponding to the ingress port 115 by generating a flow control update packet indicating one or more additional issued credits. In turn, the ingress port 115 transmits the flow control update packet to the link partner for arrival at the link partner in the transmission period of imminent credit starvation. In some embodiments, the credit control circuit 150 issues an additional credit to the link partner only by generating a flow control update packet for transmission to the link partner when at least one of the credit values 205 has reached a corresponding credit threshold value 210. In other embodiments, the credit control circuit 150 issues an additional credit to the link partner only by generating a flow control update packet for transmission to the link partner in an idle transmission period or when at least one of the credit values 205 has reached a corresponding credit threshold value 210. The method 800 then proceeds to step 875.

In step 875, the credit values and available credit values are updated to indicate the additional credit issued to the link partner. In various embodiments, the credit control circuit 150 updates the credit values 205 and the available credit values 215 to indicate each additional credit issued from the ingress port 115 to the link partner.

In some embodiments, the credit control circuit 150 determines the number of additional credits issued to the link partner based on the available credit values 215 of the ingress port 115. In these embodiments, the credit control circuit 150 updates the available credit values 215 to indicate that the additional credits issued to the link partner are no longer available. Further, the credit control circuit 150 updates the credit values 205 corresponding to the available credit values 215 to indicate that the additional credits are issued to the link partner (i.e., outstanding credits). The method 800 then ends. In some embodiments, the method 800 returns to step 820 after step 875.

In various embodiments, the method 800 may include more or fewer than the steps 805-875 described above and illustrated in FIG. 8. In some embodiments, the steps 805-875 of the method 800 may be performed in a different order than the order described above and illustrated in FIG. 8. For example, the step 830 may be performed before the step 825. In some embodiments, some of the steps 805-875 of the method 800 may be performed in parallel or substantially simultaneously. For example, the step 825 may be performed in parallel or substantially simultaneously with step 830. In various embodiments, one or more of the steps 805-875 may be performed more than once in the method 800. For example, each of the steps 820-875 may be performed more than once in the method 800.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. An integrated circuit device comprising a packet switch having an ingress port and an egress port, the packet switch comprising:
   a credit control circuit coupled to the ingress port and configured to issue initial credits to a link partner based on credit values of the ingress port and update the credit values of the ingress port to indicate credits consumed by the link partner as packets are received from the link partner at the ingress port, select credit threshold values corresponding to a transmission period of imminent credit starvation for the link partner, compare the updated credit values of the ingress port with the credit threshold values, and when at least one of the updated credit values of the ingress port has reached a corresponding credit threshold value issue additional credits to the link partner by transmitting a flow control update packet indicating the additional credits issued to the link partner, and wherein the transmission period of imminent credit starvation immediately precedes a subsequent transmission period in which credit starvation could occur in the link partner without the link partner receiving at least one additional credit in the subsequent transmission period.

2. The integrated circuit device of claim 1, wherein the flow control update packet contains a header credit value indicating a number of header credits and a data credit value indicating a number of data credits, and the ingress port is further configured to transmit the flow control update packet to the link partner.

3. The integrated circuit device of claim 1, wherein the credit control circuit is further configured such that, after issuing the initial credits to the link partner, additional credits are only issued to the link partner when at least one of the updated credit values of the ingress port has reached a corresponding credit threshold value.

4. The integrated circuit device of claim 1, wherein the credit control circuit is further configured to identify idle transmission periods and issue additional credits to the link partner by generating flow control update packets for transmission to the link partner in the idle transmission periods.

5. The integrated circuit device of claim 4, wherein the credit control circuit is further configured such that, after issuing the initial credits to the link partner, credits are only issued to the link partner in the idle transmission periods or when at least one of the updated credit values of the ingress port has reached a corresponding credit threshold value.

6. The integrated circuit device of claim 1, wherein each of the credit threshold values is based on a round trip latency including both a packet latency for receiving a packet from the link partner at the ingress port and a packet latency for transmitting a flow control update packet from the ingress port to the link partner.

7. The integrated circuit device of claim 1, wherein the credit control circuit is further configured to allocate credits for the ingress port by allocating a number of credits to transaction types for packets, the number of credits allocated to each of the transaction types including both a header credit indicating an available storage capacity of the ingress port for storing a packet header of a packet having the transaction type and a data credit indicating an available storage capacity of the ingress port for storing a data segment of a data payload of a packet having the transaction type.

8. The integrated circuit device of claim 7, wherein the transaction types include posted-transactions, non-posted transactions, and completion transactions.

9. The integrated circuit device of claim 1, wherein the packet switch does not include a timing circuit for determining when flow control update packets are sent to the link partner and the packet switch does not transmit flow control update packets to the link partner at timed intervals.

10. An integrated circuit device comprising a packet switch having an ingress port and an egress port, the packet switch comprising:
    a credit control circuit coupled to the ingress port and configured to allocate credits for the ingress port by allocating credits to transaction types for packets, the credits allocated to each of the transaction types including both a header credit indicating an available storage capacity of the ingress port for storing a packet header of a packet having the transaction type and a data credit indicating an available storage capacity of the ingress port for storing a data segment of a data payload of a packet having the transaction type, the credit control circuit further configured to issue initial credits to a link partner based on credit values of the ingress port and update the credit values of the ingress port to indicate credits consumed by the link partner as packets are received from the link partner at the ingress port, select credit threshold values corresponding to a transmission period of imminent credit starvation for the link partner, compare the updated credit values of the ingress port to the credit threshold values, and when at least one of the updated credit values of the ingress port has reached a corresponding credit threshold value issue additional credits to the link partner by transmitting a flow control update packet indicating the additional credits issued to the link partner, and wherein the transmission period of imminent credit starvation immediately precedes a subsequent transmission period in which credit starvation could occur in the link partner without the link partner receiving at least one additional credit in the subsequent transmission period.

11. The integrated circuit device of claim 10, wherein the flow control update packet contains a header credit value indicating a number of header credits and a data credit value indicating a number of data credits, and the ingress port is further configured to transmit the flow control update packet to the link partner.

12. The integrated circuit device of claim 10, wherein the credit control circuit is further configured such that, after issuing the initial credits to the link partner, additional credits are only issued to the link partner when at least one of the updated credit values of the ingress port has reached a corresponding credit threshold value.

13. The integrated circuit device of claim 10, wherein the credit control circuit is further configured to identify idle transmission periods and issue additional credits to the link partner by generating flow control update packets for transmission to the link partner in the idle transmission periods.

14. The integrated circuit device of claim 13, wherein the credit control circuit is further configured such that, after issuing the initial credits to the link partner, credits are only issued to the link partner in the idle transmission periods or when at least one of the updated credit values of the ingress port has reached a corresponding credit threshold value.

15. The integrated circuit device of claim 10, wherein each of the credit threshold values is based on a round trip latency including both a packet latency for receiving a packet from the link partner at the ingress port and a packet latency for transmitting a flow control update packet from the ingress port to the link partner.

16. The integrated circuit device of claim 10, wherein the transaction types include posted-transactions, non-posted transactions, and completion transactions.

17. The integrated circuit device of claim 10, wherein the packet switch does not include a timing circuit for determining when flow control update packets are sent to the link partner and the packet switch does not transmit flow control update packets to the link partner at timed intervals.

18. The integrated circuit device of claim 10, wherein the link partner is configured to determine, based on the initial credits issued to the link partner and the additional credits issued to the link partner, whether the ingress port has a storage capacity for storing a packet to be transmitted from the link partner to the ingress port.

19. A method of controlling packet flow in a packet switch having an ingress port and an egress port, the method comprising:
    issuing initial credits to a link partner based on credit values of the ingress port;
    updating the credit values of the ingress port to indicate credits consumed by the link partner as packets are received from the link partner at the ingress port;
    selecting credit threshold values corresponding to a transmission period of imminent credit starvation of the link partner, wherein the transmission period of imminent credit starvation immediately precedes a subsequent transmission period in which credit starvation could occur in the link partner without the link partner receiving at least one additional credit in the subsequent transmission period;
    comparing the updated credit values of the ingress port with the credit threshold values; and
    issuing additional credits to the link partner when at least one of the updated credit values of the ingress port has reached a corresponding credit threshold value by generating a flow control update packet indicating the additional credits issued to the link partner and transmitting the flow control update packet to the link partner.

20. The method of claim 19, wherein the flow control update packet contains a header credit value indicating a number of header credits and a data credit value indicating a number of data credits, and transmitting the flow control update packet to the link partner comprises transmitting the flow control packet to the link partner.

21. The method of claim 19, wherein, after issuing the initial credits to the link partner, additional credits are only issued to the link partner when at least one of the updated credit values of the ingress port has reached a corresponding credit threshold value.

22. The method of claim 19, further comprising:
    identifying idle transmission periods; and
    issuing additional credits to the link partner by transmitting flow control update packets to the link partner in the idle transmission periods.

23. The method of claim 22, wherein, after issuing the initial credits to the link partner, credits are only issued to the link partner in the idle transmission periods or when at least one of the updated credit values has reached a corresponding credit threshold value.

24. The method of claim 19, wherein each of the credit threshold values is based on a round trip latency including both a packet latency for receiving a packet from the link partner at the ingress port and a packet latency for transmitting a flow control update packet from the ingress port to the link partner.

25. The method of claim 21, further comprising allocating credits for the ingress port by allocating credits to transaction types for packets, the credits allocated to each of the transaction types including both a header credit indicating an available storage capacity of the ingress port for storing a packet header of a packet having the transaction type and a data credit indicating an available storage capacity of the ingress port for storing a data segment of a data payload of a packet having the transaction type.

26. The method of claim 25, wherein the transaction types include posted-transactions, non-posted transactions, and completion transactions.

27. The method of claim 19, wherein a timing circuit is not utilized for determining when flow control update packets are sent to the link partner, and flow control update packets are not transmitted to the link partner at timed intervals.

\* \* \* \* \*